Jan. 20, 1942.     R. S. DRUMMOND     2,270,422
METHOD OF CUTTING GEARS
Filed Aug. 10, 1936     9 Sheets-Sheet 1

Fig. 1.

INVENTOR.
ROBERT S. DRUMMOND
BY
Whittemore Hulbert + Belknap
ATTORNEYS.

Jan. 20, 1942. R. S. DRUMMOND 2,270,422
METHOD OF CUTTING GEARS
Filed Aug. 10, 1936 9 Sheets-Sheet 4

INVENTOR.
ROBERT S. DRUMMOND
BY
Whittemore Hulbert + Belknap
ATTORNEYS.

INVENTOR.
ROBERT S. DRUMMOND
BY Whittemore Hulbert + Belknap
ATTORNEYS.

Jan. 20, 1942.  R. S. DRUMMOND  2,270,422
METHOD OF CUTTING GEARS
Filed Aug. 10, 1936  9 Sheets-Sheet 7

INVENTOR
ROBERT S. DRUMMOND
BY Whittemore Hulbert & Belknap
ATTORNEYS

Jan. 20, 1942.  R. S. DRUMMOND  2,270,422
METHOD OF CUTTING GEARS
Filed Aug. 10, 1936  9 Sheets-Sheet 9

INVENTOR
ROBERT S. DRUMMOND
BY Whittemore Hulbert + Belknap
ATTORNEYS

Patented Jan. 20, 1942

2,270,422

UNITED STATES PATENT OFFICE 2,270,422

METHOD OF CUTTING GEARS

Robert S. Drummond, Detroit, Mich.

Application August 10, 1936, Serial No. 95,252

6 Claims. (Cl. 90—1.6)

The invention relates to the finishing of gears which have been roughly fashioned by any suitable method such, for instance, as by hobbing.

This application is a continuation in part of my co-pending application, Serial No. 626,768, filed July 30, 1932.

It is one of the objects of the invention to rapidly remove sufficient stock to correct all errors in the original form and to obtain a high degree of accuracy as to tooth contour, helical angle, circular pitch, indexing, etc. My new method is particularly adapted for correcting the form of a rough cut gear prior to the heat treatment of the same so that it is unnecessary to effect any further finishing action after heat treatment, or if some finishing treatment is still desired, the amount of grinding or lapping necessary is reduced to the minimum.

Broadly stated, my improvement consists in running the rough gear in mesh with a rotary finishing tool having gear teeth, the helix angle of which are so selected with respect to the helix angle of the teeth of the gear to be finished that when said members are in proper mesh the axes of said members are crossed at an angle between 3° and 30°. The rotary gear tool is provided with one or more grooves extending in a direction from the top to the bottom of each tooth forming cutting edges. The gear teeth of the cutting tool are maintained in pressure contact with the teeth of the gear to be finished by maintaining an axial pressure between the axes, thus causing the cutting edges on the tool to cut or shave the sides of the work teeth. A feed movement is also provided causing the cutting tool and gear to be moved relative to one another in the direction of the axis of the gear thereby causing the cutting action to be spread over the entire face width of the gear to be finished.

The rotary gear cutting tool may be of various different constructions and the tool itself forms the subject matter of other patent applications. This application relates to the method of cutting or shaving gears with a rotary gear cutting tool and involves new principles which so far as I am aware were unrecognized prior to my invention.

Machines on which my method may be carried out may be constructed in various ways and form the subject matter of other patent applications. However, in order to fully point out all of the various new features of my method of cutting or shaving gears, it is thought desirable in this application to illustrate and describe certain machines and certain cutting tools which are not in themselves claimed in this application. Therefore I shall first describe the machines and the cutting tools, and then point out more in detail the novel methods underlying the invention claimed in this application.

*Machine for carrying out the method of cutting gears*

One form of a machine in which my method of cutting gears may be carried out is shown in Figures 1 to 4 and comprises essentially an arbor A for the gear to be finished, an arbor B for the finishing tool adjustable in spacing and in angular relation to each other so that the work may be placed in intermeshing relation with the tool. The arbor B is driven from a motor C through the medium of a step-down transmission D, shaft D', pulley D², belt E and pulley E'. The arbor A is mounted between head and tail stocks F and G on a carriage H which is slidably mounted on ways I on a head I' vertically adjustable on a column J. This column is supported on arcuate ways K on the bed L on which latter is mounted the arbor B and drive mechanism therefor. Thus, the arbor A may be angularly adjusted with respect to the arbor B by adjustment of the column J around the arcuate ways K. The spacing between the arbors can be adjusted by raising or lowering the head I' on the column J and the arbor A may be axially reciprocated by movement of the carriage H on the ways I. As shown, the mechanism for accomplishing this reciprocation consists of a further step-down gearing M which actuates a crank M' adjustable in throw which in turn is connected by a link N to a vertically extending rockshaft N'. Splined on this rockshaft N' is a gear wheel N² for actuating a rack N³ on the carriage H. Thus simultaneously with the rotation of the arbors A and B a slow reciprocating movement is imparted to the arbor A in an axial direction by the movement of the carriage H. The amount of movement is determined by the adjustment of the throw of the crank M' and the timing is such that for a rotational speed such as 400 R. P. M. the reciprocation of the carriage is only 4 inches per minute. The reciprocation should be proportioned to the diameter of the work to provide a selective rate of feed for each revolution of the work. The amount of reciprocation of the work is just sufficient to cause the cutting edges of the finishing tool to traverse the entire width of the work gear without permitting the work gear to pass out of contact with the guiding surfaces of the finishing tool on opposite sides of the cutting edges.

The machine is also preferably provided with automatic reversing mechanism by which, after the work has completed one stroke of the reciprocation, it is reversed and fed in the opposite direction. It is also preferable to reverse the direction of rotation of the work gear and finishing tool when the feed is reversed. Any suitable reversing mechanism may be employed but, as diagrammatically shown in Figure 4, there is a reversing electric switch O actuated through timing gears O' which causes the reversal of the electric motor C after a predetermined number of revolutions thereof.

In the operation of the machine as thus far described, the gear Q to be finished is mated with a suitable finishing tool having a helical angle such that when in proper mesh with the gear Q the axes of the gear and tool will be inclined at an angle to one another between the limits of three degrees and thirty degrees, preferably in the neighborhood of ten degrees.

After the machine has been properly set, it is started in operation by energizing the electric motor which causes the gear and tool to roll together and at the same time to have a longitudinal feed movement of the gear in the direction of the axis thereof. At the end of the feeding stroke in one direction, the feed is automatically reversed and at the same time the direction of rotation of the cutter is preferably reversed. The head I' is adjusted downwardly by means of the hand wheel 83 to cramp the gear Q against the finishing tool P. The head may be periodically adjusted downward until the desired amount of metal has been removed and the gear is entirely finished.

A modified rotary gear cutting machine is illustrated in Figures 5 to 11. In this machine a compact structure is obtained which is automatic in operation and is adaptable particularly for accurate commercial finishing of roughed-out gears prior to heat treatment. As shown in the drawings, the frame 101 of the machine has an enlarged base portion 102 from which a column 103 extends upwardly at the rear of the machine and has a forwardly projecting portion 104. The frame of the machine is hollow and in addition to being designed to produce a rigid structure is adapted to house the driving mechanism of the machine. A head 105 adapted to swivel about a vertical axis is mounted in the forwardly projecting portion 104 of the frame. The head comprises a housing 106 having an annular bearing 107 and shoulder 108 for swivelly engaging the bearing 109 and thrust surface 110 of the frame portion 104. For supporting the head in position there are a plurality of supporting studs 111 projecting through arcuate slots 111A in the frame and secured with nuts 112 in cutaway portions 106A. The nuts may be loosened during the angular adjustment of the head and tightened when the head has the desired angularity. In the upper portion of the frame is mounted an electric motor 113 having a suitable gear reduction mechanism 114 within the hollow frame and having a driven shaft 115 depending into the head 105. A second vertical shaft 116 is journaled within the head 105 and is drivingly connected to the shaft 115 by the gears 117 and 118. The head 105 is provided with the bearing retaining portions 119 and 120, the latter receiving a main bearing 121 for the horizontally arranged shaft 123. The head 105 is also provided with a cover 124 having a second main bearing 125 for the shaft 123. For rotating the shaft, there is mounted thereon a bevel gear 126 which meshes with the bevel gear 127 on the lower end of the vertical shaft 116. The forward end of the shaft 123 is provided with a cylindrical portion 128 on which a gear finishing tool 130 may be mounted. The tool is retained in position against a collar 129 by a retaining nut 131 which in turn is on a guiding spindle 132 supported within a bearing 122. With the construction thus far described, the rotation of the electric motor 113 transmitted through the gearing drives the finishing tool 130 about a horizontal axis which may be adjusted angularly if desired by means of the swivel mounting of the head 105.

Figure 1:
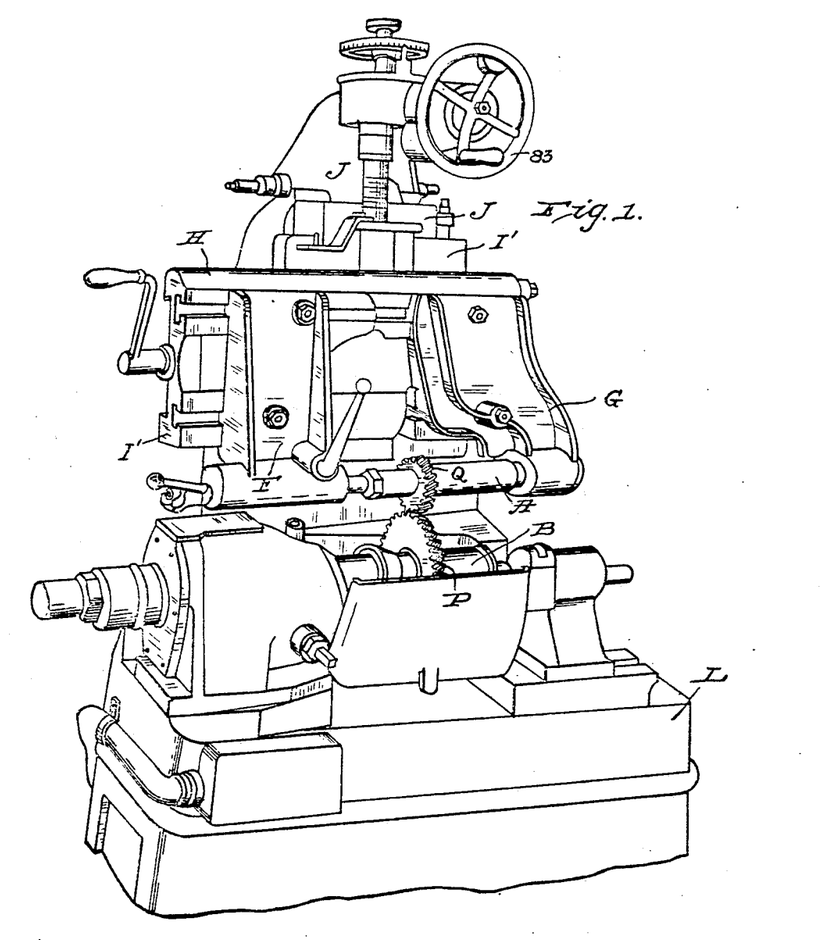
Figure 1 is a perspective view of a machine embodying my invention, showing one form of rotary gear cutting tool in engagement with a gear to be cut or shaved.
Figures 2, 3, 4:
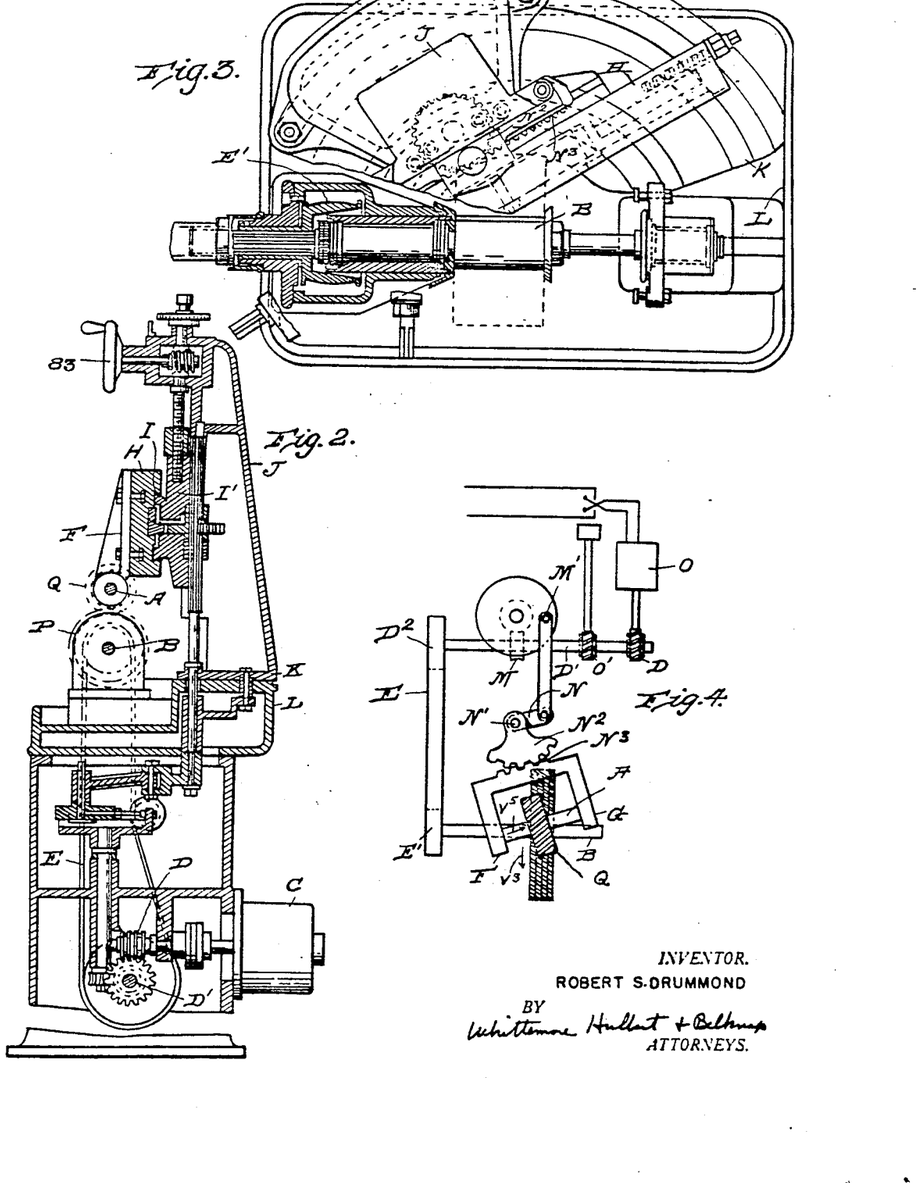
Figure 2 is a vertical central section through the machine.
Figure 3 is a sectional plan view.
Figure 4 is a diagram illustrating the operation of the machine and the electric timing mechanism therefor.
Figure 5:
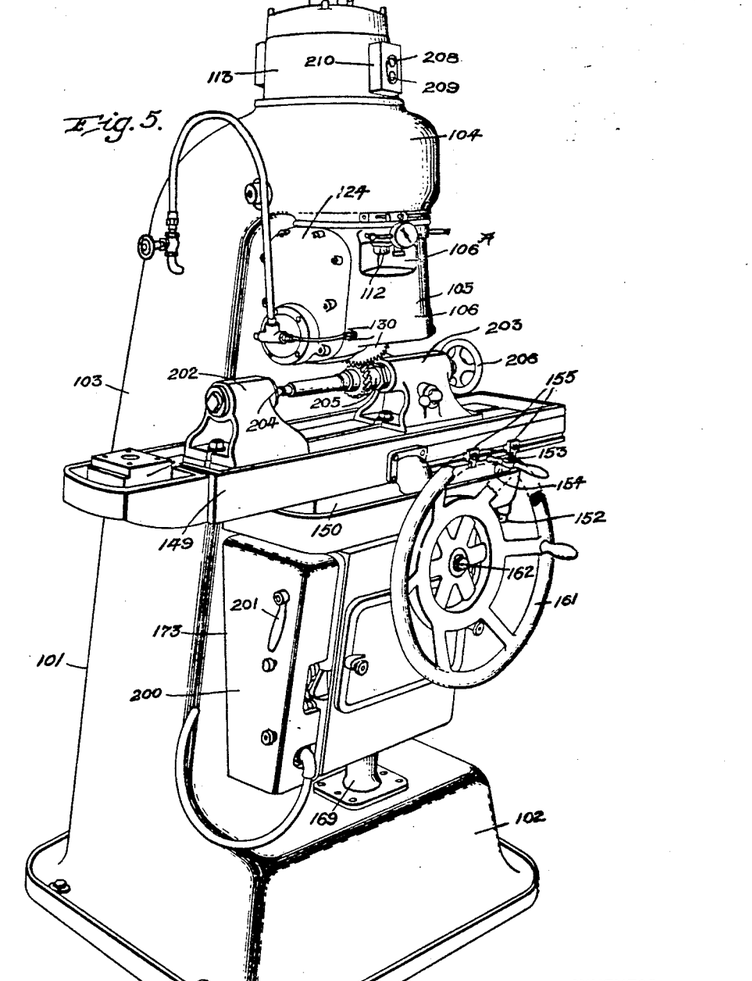
Figure 5 is a perspective view of a modified construction of a rotary gear cutting machine.
Figures 6, 10:
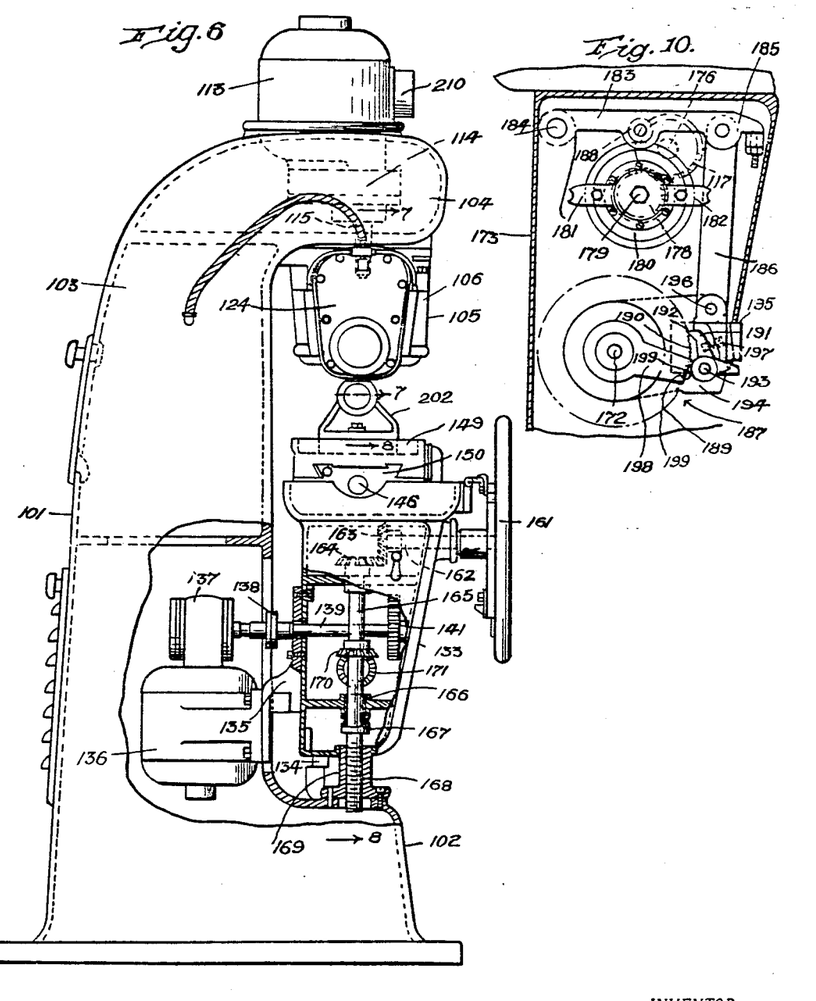
Figure 6 is a sectional side elevation thereof.
Figure 10 is a vertical section on the line 10—10 of Figure 8.
Figure 7:
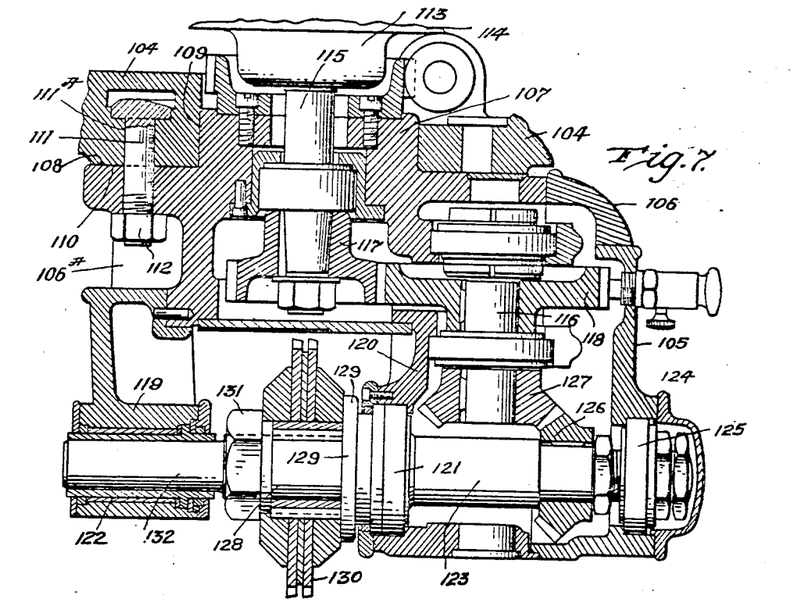
Figure 7 is a vertical section on the line 7—7 of Figure 6.
Figure 8:
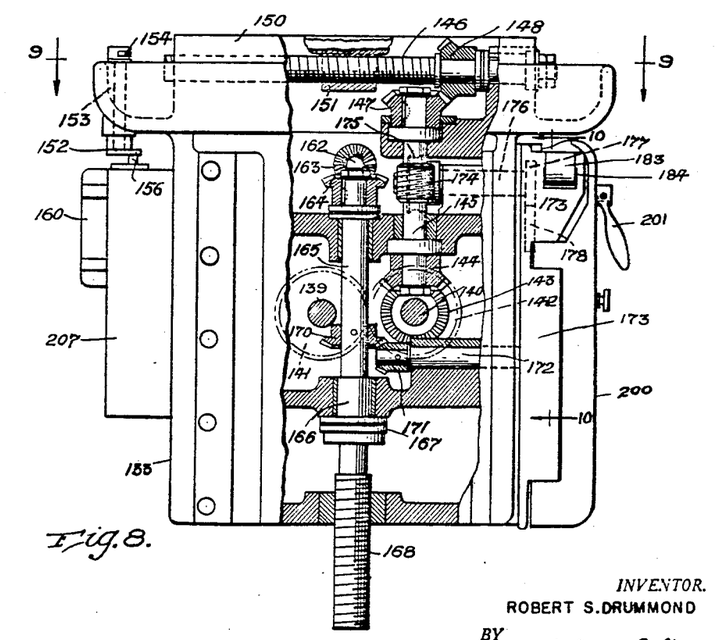
Figure 8 is a vertical section on the line 8—8 of Figure 6.

Beneath the head 105 is the work table indicated generally by the numeral 133. The table is vertically adjustable on ways 134 carried by the column 103. The table has a bracket 135 at the rear thereof projecting into the hollow column and supporting an electric motor 136 and gear reduction mechanism 137. A coupling 138 connects the mechanism 137 to a horizontal shaft 139 which in turn is connected to the parallel shaft 140 by change gears 141 and 142. The shaft 140 is connected by bevel gears 143 and 144 to the vertical shaft 145 which in turn drives the horizontal screw 146 through the bevel gears 147 and 148. A carriage 149 is mounted on horizontal ways 150 and has a depending nut 151 engaging the screw 146 for feeding the same. It will, therefore, be apparent that whenever the electric motor 136 is energized the carriage 149 will be fed axially by the feed screw 146. In order to reverse the direction of feed the electric motor 136 is reversed. For automatically reversing the carriage a suitable mechanism is provided. As shown, this comprises a lever 152 pivoted at 153 on the table and having a lug 154 intermediate the two adjustable stops 155 on the carriage 149. The lever has a pin 156 arranged intermediate the arms 157 of a lever 158 which in turn oscillates about a shaft 159. This shaft extends within a box 160 containing a reversing electric switch which being of conventional construction is not shown in detail. It will be apparent, however, that the stops 155 on the carriage alternately oscillate the lever 152 which in turn trips the lever 158 and oscillates the shaft 159 of the reversing switch. The reversing switch is diagrammatically illustrated in the electric diagram.

Figure 9:
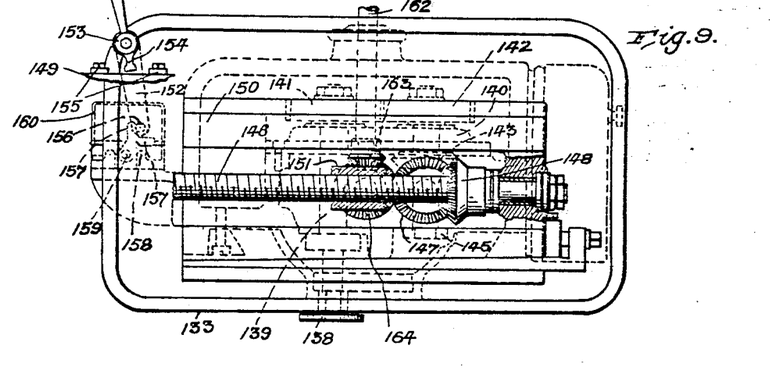
Figure 9 is a sectional plan view on the line 9—9 of Figure 8.

The table 133 is vertically adjustable on the ways 134 by means of a hand wheel 161 in the front of the machine. This wheel is mounted on a shaft 162 extending within the hollow table and has a beveled pinion 163 thereon engaging a beveled gear 164 on a vertical shaft 165. The shaft is rotatably mounted in a bearing 166 on the table and is adapted to elevate and lower the table through the thrust bearing 167. A feed screw 168 extends downwardly from the shaft 165 and engages a nut 169 mounted on and secured to the base of the machine. Thus by rotating the hand wheel the table may be adjusted toward and away from the head 105. For automatically feeding the table 133 toward the head 105 suitable automatic mechanism is provided. A beveled gear 170 on the shaft 139 engages the beveled gear 171 on the horizontal shaft 172 which in turn extends into a box 173 on the opposite side of the table from the box 160. The vertical shaft 145 has a worm 174 thereon meshing with a worm wheel 175 on a horizontal shaft 176 which also projects into the box 173 above the shaft 172. The box 173 contains the automatic feed mechanism for elevating the table 133 during the reciprocation of the carriage 149. The shaft 176 is connected by the gears 177 and 178 to a parallel shaft 179 on which is mounted a disc 180. Attached to the disc are cam arms 181 and 182 which project outwardly beyond the outer surface of the disc. A lever 183 is fulcrumed in the box 173 at the point 184 and has its free end 185 connected by a link 186 to a ratchet mechanism 187 for periodically rotating the shaft 172. On the lever 183 is a cam roller 188 arranged in the path of oscillation of the cam arms 181 and 182 so that when either of the arms strike the roller the lever 183 is moved about its pivot 184 thus actuating the link 186. The shaft 172 carries a ratchet wheel 189 having teeth 190. A ratchet pawl 191 having a nose 192 engages the teeth 190. The ratchet pawl is pivotally mounted at 193 on a carrier 194 which in turn is slidable in the guide 195 and connected by a pin 196 to the link 186. A spring 197 normally holds the pawl in engagement with the ratchet teeth. Rotatably mounted on the shaft 172 is an adjustable arm 198 having an outer cylindrical surface 199 adapted to engage the nose 192 of the ratchet pawl.

In the operation of the ratchet mechanism as described it will be apparent that the shaft 179 being directly connected to the carriage 149 oscillates in timed relation to the reciprocation of the carriage. The gear ratio is such that during the normal reciprocation of the carriage the shaft is oscillated to a sufficient degree so that the arms 181 and 182 alternately strike the cam roller 188. Each time the cam engages the roller the ratchet mechanism is actuated causing the ratchet wheel to be advanced a predetermined distance thereby rotating the shaft 172 which in turn gives a predetermined movement to the feed screw 168. The arm 198 is set so that after a predetermined movement of the ratchet wheel 189 the surface 199 of the arm engages the ratchet pawl and prevents further feed movement of the ratchet wheel even though the shaft 179 continues to oscillate. As previously stated, the ratchet mechanism is within a box 173 on the side of the machine and is normally closed by a door 200 controlled by the door handle 201.

The reciprocable carriage 149 carries the head and tail stocks 202 and 203 between which may be mounted the arbor for carrying the gear to be finished. Where the gear to be finished is integral with a shaft the shaft itself may be mounted between the head and tail stocks, as illustrated in the drawings. For convenience in mounting, the shaft may be inserted between centers 204 and 205, the latter being axially adjustable by a suitable hand wheel 206. Since the gear to be finished is rotated only by the intermeshing action of the finishing tool no driving mechanism is required on the carriage 149.

Figure 11:
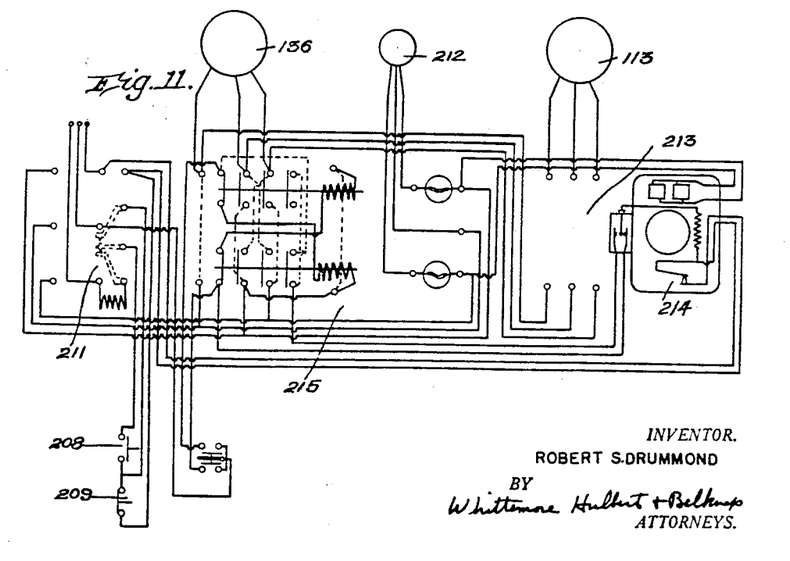
Figure 11 is an electrical diagram.

The electric control mechanism for the machine is mounted in a box 207 on the same side of the table as the housing 160 for the reversing switch. The various elements of the control mechanism may be of standard construction and it will be sufficient to show only the electrical diagram whereby the various elements are corelated in order to cause the operation of the various parts of the machine. The electrical diagram is shown in Figure 11. 208 and 209 are push buttons for starting and stopping the machine respectively. They are located in a switch box 210 at the top of the machine, as shown in Figures 5 and 6. The push buttons control a magnetic switch 211 of conventional design.

Thus when the machine is started by pressing the starter button 208 three electric motors are simultaneously operated: the head motor 113, the table motor 136 and the oil pump motor 212. A hand reversing switch 213 is arranged to change the direction of rotation of the head motor 113 with respect to the table motor 136 in order that the desired relation between these motors may be obtained. 214 represents an automatic stop mechanism adapted to stop the operation of the machine after a predetermined interval. The reversing switch 160 previously described as being mechanically operated at the end of each stroke is shown in the diagram as being electrically connected to reversing contactor mechanism 215. This mechanism electrically reverses both the head motor 113 and the table motor 136.

In the operation of the machine as previously described the desired finishing tool is mounted in the head 105 and the gear to be finished is mounted on the carriage 149 with its axis parallel to the axis of reciprocation of the carriage. The angular relation between the axis of the gear and the axis of the finishing tool is determined by the angular setting of the head 105. The table 133 is adjusted to the necessary height to obtain intermeshing engagement between the tool and gear and the arm 198 on the ratchet mechanism is adjusted to cause the desired automatic feed of the table toward the head. When the necessary adjustments have been made the machine is set in operation by pushing the starter button 208. This energizes the head motor and table motor, the head motor rotating the finishing tool and thereby driving the gear to be finished and the table motor causing a slow feed in the direction of the axis of the gear. When the table has progressed the desired distance to finish the entire width of the gear a stop 155 trips the lever 154 thereby actuating the reversing switch 160 which through the electric contactors 215 electrically reverses both the head motor and the table motor. This causes the finishing tool to rotate in the opposite direction while the feed is also in the opposite direction. Just prior to the actual tripping of the reversing switch the oscillating disc 180 in the box 173 has been rotated sufficiently to contact with the cam roller 188 and actuate the ratchet mechanism 187 thereby rotating the shaft 172 and consequently the feed screw 168. Thus at about the time of reversing of the motors the table is fed a predetermined distance toward the head thereby placing the gear and finishing tool under a predetermined cramp action for the succeeding lateral feed movement. As the operation continues the table is automatically fed toward the head at the end of each stroke until the desired amount of stock has been removed from the gear. At this point the arm 198 of the ratchet mechanism engages the pawl 191 and prevents further upward movement of the table. The gear and tool continue to rotate together and the reciprocation of the carriage continues for a predetermined movement of idling strokes during which time the surfaces of the gear teeth are given a final finishing action. At this time the automatic stop mechanism 214 comes into play and through the magnetic switch 211 stops each of the electric motors. The gear may then be removed and replaced by another rough cut gear and the cycle of operation is again repeated.

Figures 12, 13, 13A, 14, 15, 16, 17, 18:
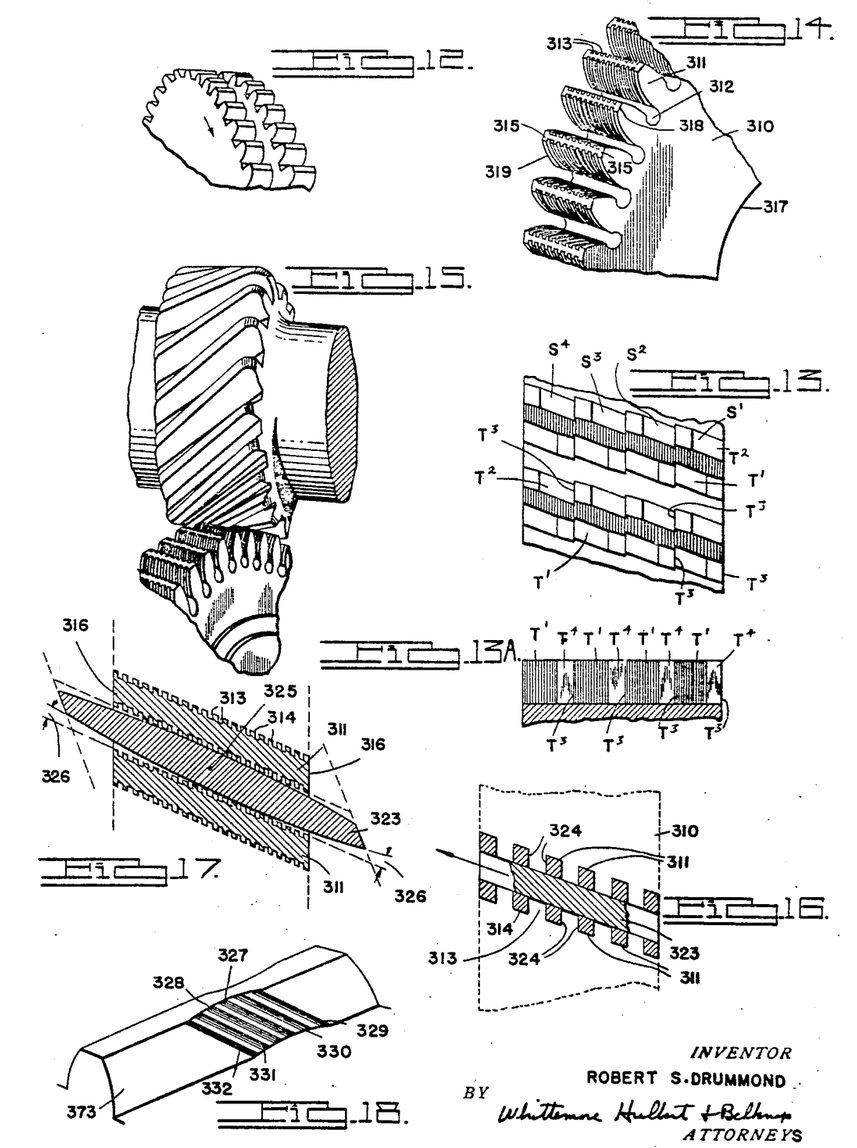
Figure 12 is a perspective view of one form of rotary gear cutting tool.
Figure 13 is a top plan view of a modified form of rotary gear cutting tool.
Figure 13a is a side view of a tooth of the cutter of Figure 13.
Figure 14 is a perspective view of another rotary gear cutting tool.
Figure 15 is a perspective view showing a rotary gear cutting tool in operative relation to a helical gear to be shaved.
Figure 16 is a diagrammatic view representing the developed pitch plane of a gear and rotary cutting tool illustrating the cutting action of the tool.
Figure 17 is a diagram similar to Figure 16 showing the cutting action of the tools illustrated in Figures 14 and 15.
Figure 18 is a diagram of a gear tooth in perspective showing action of the rotary gear cutting tool without axial feed movement.

In the operation of the gear finishing machine shown in Figure 5 with a rotary cutter of the type shown in Figures 14 and 15 the rotary cutter is mounted in the head so that the gashes in the cutter are located over the center of rotation of the cutter head and is locked in position on the arbor which is supported on both ends in bearings.

The gear to be cut is mounted between centers and locked endwise, the table is then moved to the right or left to bring the gear under the center of the cutter head and the table is raised to bring the gear in contact with the cutter while it is stationary. The height of the table is noted on the graduations of the hand wheel and the table is then lowered and the gear is moved to the right hand end of its travel remaining in mesh with the cutter teeth. The electrical stop for this extreme of travel is then set and the horizontal table then moved to the opposite end the proper amount for the width of the gear and the electrical stop on the table is then set for this limit of travel.

The gear can then be raised to the setting obtained by contact with the cutter and when the motors are started it will revolve the gear and move the table to one side, the cut being taken preferably against the angle of the teeth on the cutter. At the end of the stroke the table will reverse and the head motor will reverse so that with opposite directions of movement of the table the cutter will run in opposite directions.

At each end of the table stroke the automatic mechanism raises the work gear toward the cutter a measured amount which is to be removed on the succeeding stroke of the table. This feed occurs at each end of the table movement until the desired depth of cut is obtained as determined by the set of the ratchet feed mechanism on the left hand side of the table.

Additional strokes may be taken without further feeding of the gear toward the cutter and this will cause the cutter to remove the former cutter marks which are of microscopic size and give the surface of the finished gear a higher degree of finish without material change in size of the teeth. Either at the end of the cutting strokes or the end of the cutting and idling strokes the electrical unit controlling the operation of the machine will automatically stop all the motors and bring the machine to rest at the end of the table stroke. The clamps on the work arbor are then released and the gear removed from the machine.

In deciding on the direction of rotation of the cutter and the relative travel of the table beneath the cutter it is worth noting that the cutter is rotated in such a direction relative to the table travel that the gear travels against the rotation of the cutter and against the angle of the teeth on the cutter. The best cutting action can thus be obtained although some cutting action and finishing effect is obtained with other combination of rotation of the cutter and the cross sliding motion of the gear.

*Rotary gear cutting tools used in the method of cutting gears*

The preceding description has been directed mainly to machines for carrying out my method. I will now describe certain rotary cutting tools which may be used in my method of machining gears. Figure 12 shows in perspective a rotary gear cutting tool provided with a single circumferential gash between the ends of the teeth. Figures 13 and 13a show a modified form of gear cutting tool having a plurality of cutting edges between the ends of the gear teeth. Figure 14 illustrates another modified form of rotary gear cutting tool having a greater number of cutting edges intermediate the ends of the teeth. In each of these three modifications the cutting tool is in the form of a helical gear.

The cutting tool illustrated in Figures 13 and 13a is made up of a plurality of discs S', S², S³ and S⁴, each of which has similar helical teeth. In order to form the cutting edges the flank of the tooth adjacent to the leading edge of the next disc is backed off or otherwise relieved as indicated at T' on one side of the helical teeth and at T² on the opposite side. This results in the formation of a series of cutting edges T³ on each disc. The sides of the teeth in each disc are only partially relieved, leaving unrelieved portions T⁴ which serve as guides for the teeth of the work engaging therewith.

Figures 26, 27, 28, 29, 30:
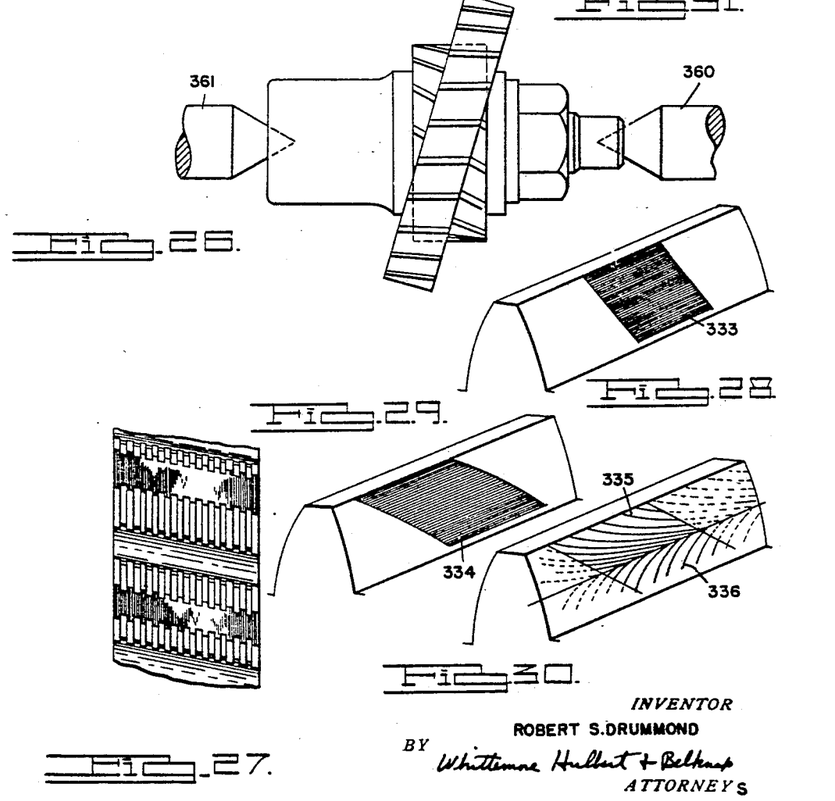
Figure 26 is a diagrammatic plan view of a cutter and a work gear arranged for normal cutting.
Figure 27 is a fragmentary edge view of a rotary cutter of the type shown in Figure 14.
Figure 28 is a diagram illustrating the band of contact on a spur gear when mating with a helical gear in a crossed axes relationship.
Figure 29 is a diagram illustrating the band of contact on a helical gear when mating with another gear in a crossed axes relationship.
Figure 30 is a diagram illustrating the path of the cutting edges when cutting a helical gear.

The cutting tool illustrated in Figures 14 and 27 is designated by the reference character 310 and is preferably formed from a forged high speed steel blank. The teeth 311 which are preferably helical are formed in the blank by hobbing to a slightly greater size than is desired in the finished cutter and at the roots of the teeth the blank is provided with a series of transversely extending holes 312, the diameter of which is greater than the normal width of the bottom of the tooth slots, thus providing a cylindrical relief slot. The sides of the gear teeth are provided with a series of serrations 313 extending from the tops of the teeth to the clearance slots 312. These serrations are preferably closely spaced to form intermediate lands 314 of approximately the same width as the width of the serrations. In one preferred cutting tool the width of the slots and the width of the lands are each .035 inch and the depth of the serrations is also .035. In order to strengthen the rotary cutting tool the thickness of the lands 315 (Figure 14) adjacent the end faces of the gear is greater than the intermediate lands 314, for example .070 inch.

The cutting tool as described after having been formed with the serrations and root relief as described is then heat treated to give the desired physical properties and is subsequently finished to give extreme accuracy to the gear teeth. The side faces 16 of the tool are ground to accurate parallelism while the inside diameter 317 of the central aperture and the outside diameter 318 of the gear teeth is finish ground. The side faces 319 of the gear teeth are then accurately ground to the exact profile desired, which while in general is of involute curvature is nevertheless preferably modified as hereinafter more fully set forth to give the exact curvature desired. The rotary cutting tool manufactured in accordance with the general directions given above is one form of my invention. It will be noted that while the profile of the teeth is accurately finish ground, the serrations 313 intermediate the lands 314 are not ground, but retain the surface characteristics of the steel which has been heat treated but not subsequently finished. Similarly the cylindrical surfaces of the relief slot 312 are unground and have the same surface characteristics.

Various other rotary cutting tools may also be used in carrying out my invention, but as the cutting tool per se is not the subject matter of this application, they will not be referred to in detail, but reference may be had to my co-pending applications for patent, Serial Nos. 52,565 and 52,566, filed December 2, 1935.

The method of cutting gears

The general method of cutting or shaving gears in accordance with my present invention is as follows. The rotary gear cutter is brought into intermeshing relationship with the roughed out work gear which is to be finished. The axes of the cutter and work gear are crossed at an angle, preferably between 3° and 30°. The work gear and rotary cutting tool are rotated together in the manner of intermeshing gears, suitable means being provided for driving one of the members, which member in turn drives the other member by the intermeshing action of the teeth. Preferably the cutter is the driving member and the work gear is the driven member. During the rotation of the gear and cutter, pressure is maintained between the same to hold both sides of the teeth of the cutter to contact with the teeth of the work gear. This action causes both sides of the work gear teeth to be simultaneously finished. During the rotation of the gear and cutter a feed movement is imparted to one in the direction of the axis of the gear. Preferably this feed movement is in the form of a reciprocating motion of sufficient amplitude to cause the cutting edges of the finishing tool to traverse the entire width of the work gear without permitting the work gear to pass out of contact with the finishing tool. At the end of the reciprocation in one direction the feed is automatically reversed and at the same time the direction of rotation of the cutter is preferably reversed. During the rotation and reciprocation the gear and cutting tool are periodically adjusted toward each other until the desired amount of metal has been removed from the surface of the work gear.

One of the characteristic features of the finishing action obtained by the use of the improved cutter is that the work gear is finished with a rotary tool and the accuracy of the work is predicated mainly upon the accuracy of the rotary tool itself as distinguished from the usual forms of gear cutting operations wherein the timing is a major feature. It should be noted that the cutting portions of the finishing tool are always located between guiding surfaces and the finishing tool therefore acts not only as a cutter but also as a guide for insuring extreme accuracy of the cut. This action is illustrated in Figure 16 which is a diagram representing the development of the pitch plane of the gear and cutter. The gear 321 to be finished is shown above the cutter 310, the axes being arranged at an angle between 3° and 30°. The tooth 323 of the work gear is represented as intermeshing between the two adjacent cutter teeth 311. When the work gear tooth is caused to move in the direction of the arrow (see Figure 16) with respect to the cutter teeth, the cutting edges are as indicated at 324 formed by the intersection of the lands 314 with the sides of the serrations 313. While the cutting action takes place on these cutting edges it will be observed that the gear tooth 323 bears against the lands 314 on opposite sides of the gear tooth and on both sides of the cutting edges 324, thus accurately positioning the gear tooth 323 with respect to the tooth profiles of the cutting teeth 311.

Figure 17 is another diagram illustrating the cutting action showing the gear tooth 323 between adjacent teeth 311 of the cutter. The center of crossed axes is located at 325 and at this point there is the greatest pressure of contact between the cutter and the gear because the surfaces of the cutter teeth and the gear tooth contact as arcs of circles and as shown, the maximum pressure is at the center of the crossed axes and there is backlash as indicated by the dimension 326 where the gear tooth 323 leaves the contact with the cutter. This contact between the cutter teeth and the gear tooth as will be noted in the diagram is on a circular arc which develops a cutting action as shown in Figure 18 in which the center cuts 327 and 328 are deeper than the outer cuts 329, 330, 331 and 332 respectively. The reciprocating feed movement carries this area of greatest contact across the sharp edges of the cutter and spreads the finished surface across the entire gear tooth 323.

In order to explain my improved method of gear cutting, it is necessary to understand certain principles relating to the use of crossed axes for cutting purposes. As far as I am aware, these principles were unrecognized prior to my invention.

In Figure 26 I have shown the crossed axes relation between the rotary cutting tool and the work gear. The teeth of the mating gears in this relation do not contact over their entire face width but contact in certain well defined paths which are different for gears of different characteristics. The band of contact on a spur gear when run with a mating gear of a different angle is substantially parallel to the line of rotation of the spur gear, varied only by the angular setting, as indicated at 323 in Figure 28. The band of contact on a helical gear extends at an angle to the tooth face as indicated at 334 in Figure 29. The angle of the band is a function of the helix angle of the gear. The width of the band of contact is determined by the difference in helix angle of the mated gears, that is the angularity of the crossed axes, being full width on spur running with spur, or helical running with helical of equal angles and opposite hand, and being narrow when 45° right hand is running with 45° right hand which gives, theoretically, a point of contact and generates, theoretically, a line. The band of contact between zero and 10° crossed axes is wide. The band of contact between 15° and 25° crossed axes is fairly wide. The band of contact above 30° crossed axes is narrow. The center of the band of contact is the point of greatest pressure while at the outer edges of the band there is the point of minimum pressure. These bands of contact are formed both on the work gear and on the gear cutter, being characteristic of the helix angle of the work gear and the gear cutter respectively. When the cutter and gear are run together without axial feed movement and under cramp action, that is with pressure between the same, the cutter teeth sink into the teeth of the work gear and mark the gear as indicated in Figure 18. The individual teeth on the cutter sink in to different depths, the greatest being in the middle at the center of the band on the work gear. The cutter teeth at the outer edges of the cutter gear will not even touch the tooth face of the work gear.

The relative motion between the surfaces of the teeth of the cutter and the teeth of the work gear is, as shown in Figure 30, on a typical curved line 335 starting at the top of the tooth and having a curved contact until at the pitch line the relative motion is parallel to the pitch line. The curve then reverses along the pitch line and dips down toward the bottom of the tooth as indicated at 336. Due to the relative motion between the parts as described, the teeth of the cutter gear at the upper part of the work tooth are cutting in one direction, say right hand, and in the lower part of the tooth are cutting on a left hand edge, and at the pitch line the blade will first cut to the right and then cut to the left when it reverses. Due to this reverse cutting action when the crossed axes have a sufficient angularity, the blades have a tendency to remove more material at, or near the pitch line than occurs at the top and bottom of the work teeth, creating what is called a hollow profile. This does not occur normally in hobs or shaper cutters. Rotary cutting tools such as shown in Figure 14 are normally modified in tooth contour so that the profile on the cutter is hollowed out to the amount which will compensate for the double cutting near the pitch line. The distance between the profile of the cutter teeth and a true involute curve is dependent on various conditions but at the pitch line it is normally within the range from .0003 to .0015 inch.

Due to the relatively deeper cutting at the center of the band of contact on the work gear, the cutting action during the feeding of the gear along the gear axis may be explained. This feeding spreads the cutting action over the entire face width of the work gear tooth and causes a uniform finishing action over the entire tooth. As the gear slowly moves across, a series of cutting actions take place on each cutting edge up to the center cutting edge of the tool which has the greatest depth. The lands beyond this center edge act as guides on the finished surface. The first blades which approach the surface of the gear are subjected to the most severe wear because the surface of the gear may have rough spots or carburized material of unequal hardness. Therefore these blades may wear a considerable amount and throw the resulting load on the next blade and so on until the center blade will be doing the cutting. Even when the center blade is doing the cutting, the adjacent blades are cutting on the surface of the gear prior to its contact with the center blade and it is therefore protected from abuse. This accounts for a considerable amount of the extra life of the rotary gear cutters of this invention. Thus the center cutting blades in my rotary tool may be considered as the finishing blades while the outer blades may be considered as roughing blades.

It should be pointed out that there is a fundamental difference between the cutting of gears with a rotary gear cutting tool, and a rack cutting tool and also a distinct difference between operating with crossed axes instead of parallel axes. With rack cutting, the entire face width of the gear is in contact with the rack teeth in any position of the gear on the rack, and is in contact to a uniform depth of cut. Contrary to this, a gear in mesh with a rotary cutter set at crossed axes is in tight mesh only at the center where the two axes cross. Due to the elasticity of metals and the pressure applied, the contact represents a band of contact such as occurs when two cylinders are in contact with crossed axes. The point immediately over the center of crossed axes is a point of greatest depth of contact when cutting and this shades or tapers off in the width of the band of contact until the gear face entirely leaves the cutter face, and the cutter under these circumstances will make no mark beyond the band of contact. If a gear is rolled along a rack sufficient to represent a distance greater than the circumference of the gear, the entire face of the gear is brought in contact with the rack teeth and is shaved. Even though a gear were rotated with a rotary cutter on crossed axes indefinitely, it would only contact on a band on each tooth represented by the band of contact between the crossed axes, being a very much wider band for small crossed axes and a much narrower band for obtuse crossed axes. Thus, whereas gears can be shaved without any lateral movement on a rack except to spread the wear on the rack, it is impossible to do this on rotary cutting with crossed axes. In rotary cutting an axial feed of the work is required in order to spread the contact of the tool and the work across the entire face of the gear.

Due to the fact that the contact between the gear and the rotary cutter on crossed axes is a concave surface, the edges of the blades on the tool in the center of the band cut deeper than edges of the blades more adjacent to the edges of the bank of contact and former edges therefore become finishing edges, and the latter edges can be considered as roughing edges. This materially increases the life of the cutter as the rough surfaces of the gear are first removed by the outer edges on the edge of the band of contact, and the surface is finally finished by contacting the center edges in the middle of the band of contact. It is well recognized that the contact between cylinders on crossed axes has a profile which is not truly circular but is more nearly elliptical in profile. This is also true of the contact between a rotary cutter and the gear with crossed axes relation. It has been determined definitely that the cutter profile must be varied from an involute profile by a considerable extent in order to produce on the gear a true involute curve.

Figure 23:
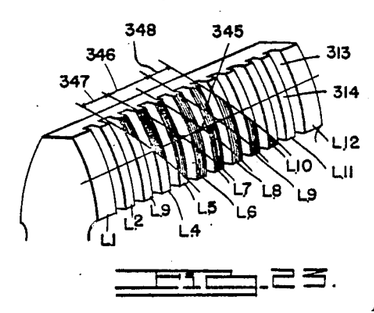
Figure 23 is a diagrammatic representation of one tooth of a helical cutter illustrating the normal cutting action.

It was heretofore pointed out that the band of contact of a helical gear with a mating gear is at an angle to the plane of rotation. This is a characteristic feature of my improved cutting tool where the teeth are helical. Thus when the tool of Figure 14 is being used to cut a work gear with a crossed axes relationship of 15° for example, not all of the edges of the serrations are actually being used for cutting. Figure 23 is a diagrammatic representation of a serrated tooth of the cutting tool with the serrations 313 and intermediate lands 314. The band of contact is represented by the shading. Assuming for example that there are twelve lands on each tooth face and that the center of the crossed axes is at the center of the tooth as shown at 345, it will be observed that the diagonal band of contact passes across the cutting edges in the central portion of the tooth but that only certain portions of most of the cutting edges are in the band. The lands are designated as $L_1$ to $L_{12}$. Lands $L_6$ and $L_7$ are effective for substantially the entire distance from tip to root. $L_3$, $L_4$, and $L_5$ have the upper portions only within the band of contact while $L_8$, $L_9$ and $L_{10}$ have only the lower portions effective. The outside lands $L_1$, $L_2$, $L_{11}$ and $L_{12}$ are practically without cutting effect when the center of crossed axes is at the point 345. The effective portions of the cutting teeth as indicated above may be subdivided into those portions which do the preliminary roughing and those that do the final finishing. This is diagrammatically illustrated by subdividing the band of contact into the finishing zone 346 and the outside roughing zones 347 and 348. Portions of the cutting edges within these zones function as finishing and roughing blades respectively.

Figure 24:
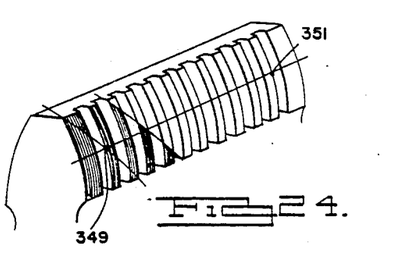
Figure 24 is a similar diagram illustrating the cutting action of the cutter when used for shoulder cutting.

One of the important uses for the improved rotary cutting tool is in shoulder cutting, that is finishing a gear which is closely adjacent another gear of larger diameter or some other obstacle which prevents the normal axial feed when the crossed axes are at the center point 345. It then becomes necessary to adjust the cutter on its arbor so that the center of the crossed axes is near one edge of the tool as indicated at 349, Figure 24. In this case the major portion of the band of contact on the tool is at one side only and the remainder of the tool is inactive. However by reversal of the tool, end-for end, the center of the crossed axes may be placed at the corresponding point 351 at the opposite end for continued usage.

Figures 25, 31:
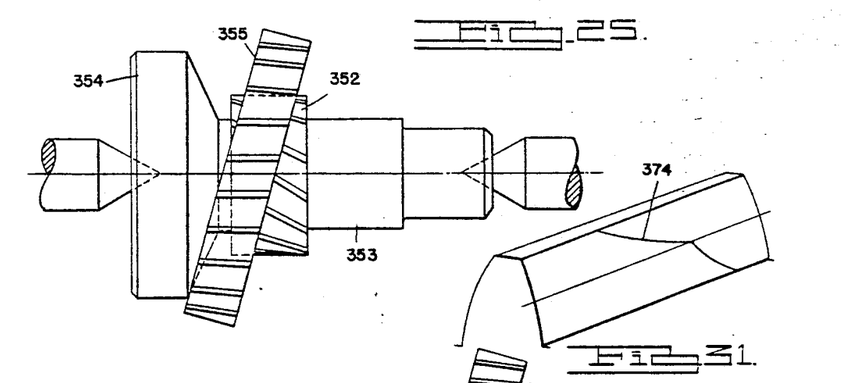
Figure 25 is a diagrammatic plan view of a cutter and a work gear arranged for shoulder cutting.
Figure 31 is a diagram similar to Figure 30 showing the path of cutter contacts when the axial feed is excessive.

Figure 25 illustrates a cutting tool in operative relation to the gear 352 on the cluster gear 353. The adjoining gear 354 is so located as to require shoulder cutting. The crossed axes center for this operation is preferably set about $\frac{1}{16}$ to $\frac{1}{8}$ of an inch from the face 355 of the cutter adjacent the gear 354.

There is a tendency for a rotary cutter when operated on shoulder cutting to give a slightly tapered tooth construction so that the chordal thickness is greater at the one end than at the other. One method of correcting this condition is to tilt the work tailstock 360 with respect to the head tailstock 361 so that the face angle of the cutter will keep the two sides without any taper. A convenient method of tilting the tailstock is to use a shim beneath the same. In some cases it may be desirable to use the shim under the headstock to correct the condition. To illustrate, in the finishing of a commercial transmission gear on an arbor having a length of nine and one-half inches between centers on the head and tailstocks, a shim ten thousandth inch thick will provide the necessary correction.

Figure 19:
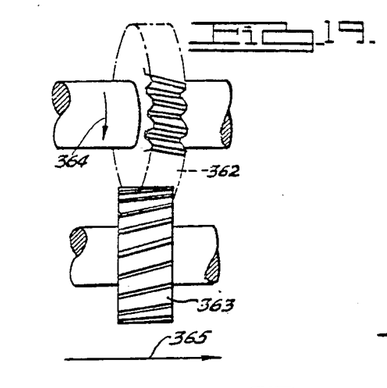
Figures 19, 20, 21 and 22 are diagrams illustrating the preferred relation between the axial feed movement and the rotation of the cutter.
Figure 20:
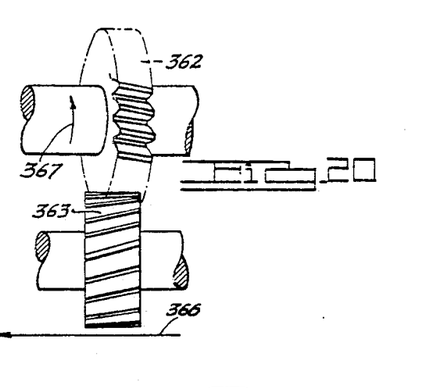
Figure 21:
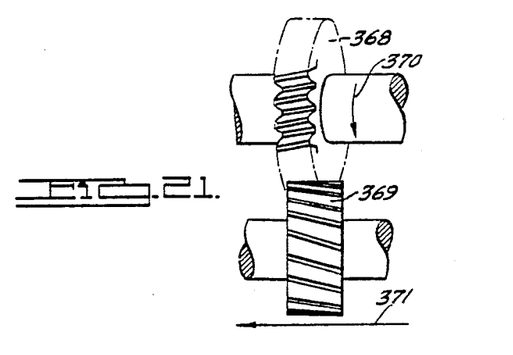
Figure 22:
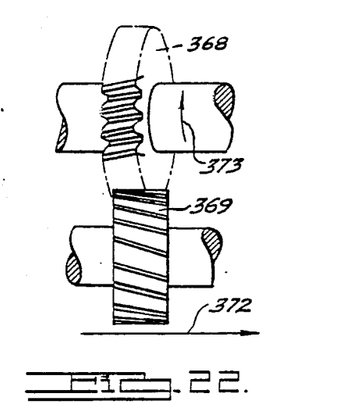

In practicing my improved method for finishing gears it is important that the correct direction of rotation for the rotary cutter be used in relation to the direction of the feed movement parallel to the axis of the gear or work. This is illustrated in Figures 19 to 22 inclusive. In Figures 19 and 20 a right-hand helical cutter 362 is shown finishing a left-hand helical gear 363. When the cutter is rotating clockwise, viewed from the left in Figure 19 as shown by the arrow 364, the direction of the feed should be to the right in Figure 19 as indicated by arrow 365. At the end of the feed movement when the direction of feed is reversed as shown in Figure 20 by the arrow 366, the direction of rotation of the cutter should also be reversed to move in a counter-clockwise direction as indicated by the arrow 367. Figures 21 and 22 show a left-hand helical cutter 368 for finishing a right-hand helical gear 369. In this case, when the direction of rotation of the cutter is clockwise when viewed from the left as indicated by the arrow 370, the direction of feed is to the left as shown by arrow 371. When the feed movement is reversed as illustrated by arrow 372 in Figure 22, the direction of rotation of the cutter should also be reversed to a counter-clockwise movement as shown by the arrow 373.

In practicing my improved method for finishing gears it is usual to have the axes crossed from 5° to 20° depending upon the type of gear being finished. In the machine illustrated in Figures 5 to 11, provision is made to have the center of the crossed axes in perfect alignment with the dead center of the head. When it is desired to finish a helical gear with a helical cutter, the gear and the cutter are usually of opposite hands such, for example, as a left-hand cutter for a right-hand gear and vice versa. By subtracting the helix angle of the cutter from the helix angle of the gear, the angular setting for the head my be determined.

Example for finishing helical gear:
 Gear helix angle__________________ 30° R. H.
 Cutter helix angle________________ 15° L. H.

Machine setting__________________ 15°
Example for finishing spur gear:
 Cutter helix angle________________ 15° R. H.
 Spur gear________________________ 0°

Machine setting__________________ 15°

The above is merely by way of illustration, since my method may be successfully used with a crossed axes relationship other than that shown above. It is usual to use a right-hand cutter when finishing spur gears since it is more convenient to set up the machine, but the invention may also be practiced in other ways.

There is a definite relation between the crossed axes setting of the cutter and the work and the width of cut obtained for each revolution of the gear. This limits the amount of feed possible in the crossed travel of the gear, whereas when finishing by a lapping tool it does not affect the operation. In normal size spur and helical gears with 15° crossed axes it is permissible to use a feed at the rate of .010 inch per revolution of work when a seven-inch cutter is rotating at a speed of four hundred feet per minute. It is one of the features of my invention that the feed in the direction of the axis of the gear is limited to correlate the cross travel of the work to the rotation thereof due to the influence of the crossed axes setting. Thus a cutter positioned with a large angle between the crossed axes, cuts across more surface of the work gear than the same cutter set to have a smaller angle between the crossed axes. If the cross feed is excessive, there is a tendency to cause a burnishing action without a satisfactory cutting action. If the feed is very fine, it keeps the cutter so much in contact with the work that again there is a tendency to get more burnishing action. One way to show the relation between the cross travel and the revolution of the work is to define the cross travel in one-thousandth of an inch feed of work in the direction of the work axis per revolution of the work.

While I have indicated above that the cross feed rate may be 0.010 inch per revolution of work, this cross feed may be considerably increased under certain conditions, particularly when roughing cutters are used as a preliminary operation to finish shaving. Thus in some instances the feed may be increased up to about 0.060 inch per revolution of work.

According to my invention, both helical and spur gears may be finished. Since the band of contact is naturally wider in the combination of a spur gear and a 15° helical cutter than it is between two helical members with 15° crossed axes, it is desirable when cutting spur gears to increase the angle of the crossed axes to a greater degree than when cutting helical gears. As an example, for cutting a six-pitch spur gear, it is more desirable to use a 20° angle between the axes than a 10° angle.

Another feature of my method of finishing gears is the setting of the rotary cutter and the work gear in such relation as to compensate for the angle variation which occurs due to the varied relationship of the axes. When a rotary cutter and a gear are running at definite center distances with a certain angular relationship of the axes to provide a good finishing action, it is permissible to maintain the same angular relationship for certain changes in depth cut such, for example, as a plus or minus 0.010 inch change in depth. When, however, the change in depth is as much as plus or minus 0.050 inch, it is necessary to change the angularity of the crossed axes in order to produce good results.

When cutting gears with a rotary tool of the type herein described operating with crossed axes, the actual cutting action of the cutting edges of the rotary tool is in the form of a reversing hook as illustrated in Figure 30. Thus the cutting action takes place on one side of a given tooth slot at the top of the cutter tooth and at the opposite side of the slot at the bottom of the tooth. If the axial feed is excessive, the cutter contacts the gear in a double curve 374 as illustrated in Figure 31.

What I claim as my invention is:

1. The method of finishing the teeth of a gear member to uniform dimensions from end to end which comprises meshing the gear member with a gashed, rotary tool member with the axes of said members crossed at an angle of less than 30°, rotating one of said members directly, relatively translating said members in a plane parallel to the axes of both of said members an amount sufficient to cause the teeth of said tool member to engage the teeth of said gear member adjacent one end thereof while maintaining the axes of said members rigidly spaced, relatively feeding said members toward each other substantially at the end of said translation to reduce the spacing of said axes, and reversing said relative translation to cause the contact between the teeth of said tool member and the teeth of said gear member to move progressively to the opposite ends of said gear teeth, while maintaining said axes rigidly at said new spacing.

2. The method of finishing the teeth of a gear member to uniform dimensions from end to end which comprises meshing the gear member with a gashed, rotary tool member with the axes of said members crossed at an angle of less than 30°. rotating one of said members directly, relatively translating said members in a plane parallel to the axes of both of said members an amount sufficient to cause the teeth of said tool member to engage the teeth of said gear member adjacent one end thereof while maintaining the axes of said members rigidly spaced, relatively feeding said members toward each other substantially at the end of said translation to reduce the spacing of said axes, reversing said relative translation to cause the contact between the teeth of said tool member and the teeth of said gear member to move progressively to the opposite ends of said gear teeth, while maintaining said axes rigidly at said new spacing, and thereafter relatively translating said members in said plane without further relative feed.

3. The method of finish cutting a gear having a shoulder adjacent thereto, comprising mating said shouldered work gear with a rotary gear cutting tool having its axis crossed with respect to the axis of said work gear, said cutter having a series of cutting edges in the gear teeth thereof, adjusting the axes of said gear and cutter so that the center of crossed axes is adjacent the edge of said cutter nearest said shoulder, rotating one of said gear members thereby driving the other, feeding one of said gear members in the direction of the axis of said work gear and adjusting the axis of one of said gear members towards the other until the desired amount of finishing action is obtained.

4. The method of finish cutting a gear having a shoulder adjacent thereof, comprising mating said shouldered work gear with a rotary gear cutting tool having its axis crossed with respect to the axis of said work gear, said cutter having a series of cutting edges in the gear teeth thereof, adjusting the axes of said gear and cutter so that the center of crossed axes is adjacent the edge of said cutter nearest said shoulder, rotating one of said gear members thereby driving the other, feeding one of said gear members in the direction of the axis of said work gear and adjusting the axis of one of said gear members toward the other until the desired amount of finishing action is obtained, slightly tilting the axis of one gear member relative to the other during said rotational and feeding movements to correct the tendency toward a tapered tooth and maintain exact parallelism on opposite sides of the work gear teeth.

5. The method of finishing the teeth of a gear member which comprises meshing the gear member at limited crossed axes with a rotary tool member having teeth conjugate to the teeth of said gear member, the teeth of said tool member having cutting edges, rolling said gear and tool in mesh, relatively translating said members in a plane parallel to the axes of said members so as to cause the contact between the teeth of said members to shift from end to end of the teeth of said gear member, and relatively feeding said members toward each other substantially at the end of a translation.

6. The method of finishing the teeth of a gear member which comprises meshing the gear member at limited crossed axes with a rotary tool member having teeth conjugate to the teeth of said gear member, the teeth of said tool member having cutting edges, rolling said gear and tool in mesh, relatively translating said members in a plane parallel to the axes of said members so as to cause the contact between the teeth of said members to shift from end to end of the teeth of said gear member, and relatively feeding said members toward each other substantially at the end of a translation, and thereafter completing at least one additional stroke without further relative feed.

ROBERT S. DRUMMOND.